C. E. OGDEN.
MEANS FOR CHARGING STORAGE BATTERIES.
APPLICATION FILED NOV. 14, 1918.
1,344,812.
Patented June 29, 1920.
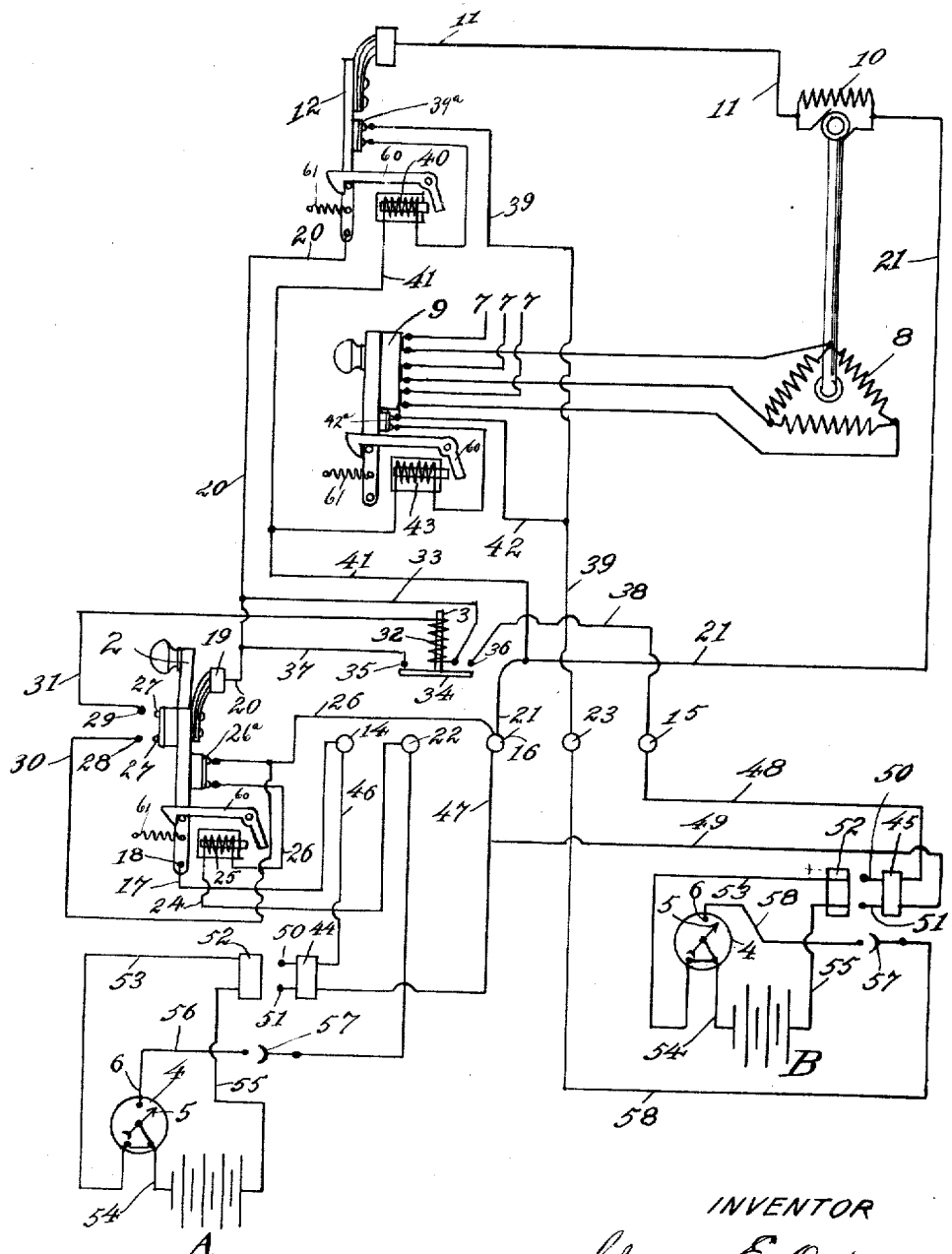
INVENTOR
Clarence E. Ogden,
BY Arthur H. Ewald,
ATTORNEY.

UNITED STATES PATENT OFFICE.

CLARENCE E. OGDEN, OF CINCINNATI, OHIO.

MEANS FOR CHARGING STORAGE BATTERIES.

1,344,812.  Specification of Letters Patent.  Patented June 29, 1920.

Application filed November 14, 1918. Serial No. 262,623.

*To all whom it may concern:*

Be it known that I, CLARENCE E. OGDEN, a citizen of the United States, and a resident of the city of Cincinnati, county of Hamilton, and State of Ohio, have invented certain new and useful Improvements in Means for Charging Storage Batteries, of which the following is a full, clear, and exact description, reference being had to the accompanying drawings, forming a part of this specification.

My invention relates to means for charging storage batteries of the kind usually used on commercial trucks, locomotives, etc. Heretofore it has been the practice, in charging batteries of the kind designated to provide a separate charging unit for each individual battery, thus resulting in the high initial cost of charging equipment, heavy current consumption from the supply circuit, and hence excessive current cost. The present invention has for its object the provision of a charging panel which permits two or three similar batteries to be connected at the same time, and whereby said batteries may be consecutively charged at regular charging rates automatically disconnecting each, as it becomes fully charged. Thus, when all of the connected batteries have been properly charged the supply circuit is automatically disconnected without the need of attention by the operator, or attendant. It thus becomes unnecessary, if the required batteries have been properly connected and the supply circuit turned on, to devote further attention to the charging panel, as the several operations for the consecutive charging and final disconnecting of the line circuit are automatically attended to.

The present invention finds its chief advantage in use with motor generator sets as the cost of this kind of equipment is comparatively high and the obviation of the necessity for the duplication of such equipment is thus of prime importance.

Further objects of the present invention will appear from the following detailed description thereof taken in connection with the accompanying drawings.

In the drawings:—

The figure is a diagrammatic view of the electrical devices and connections comprising said invention.

As so illustrated in the diagram the numeral 7 indicates the line connections for a three phase alternating current motor 8 arranged to be connected by an ordinary automatic shunt trip oil switch 9. The motor 8 operates a generator 10 which supplies direct current for the charging of the storage batteries through a wire 11. Trip oil switch 12 is provided for opening and closing the generator circuit.

Mounted on the charging panel is an automatic circuit breaker switch 2 of a well known type, and a self closing switch 3 also of well known construction.

The charging panel is provided with positive battery binding posts or connections 14 and 15, and a negative battery connection 16. The battery connection 14 is connected by wire 17 with the post 18 of switch 2. The other contact 19 of the switch 2 is connected by means of a wire 20 to switch 12. The negative battery connection 16 is connected by means of a wire 21 to the generator 10.

The charging panel is also provided with posts or connections 22 and 23 for the operation of the various automatic trip devices, the connection 22 is connected by wire 24 with a solenoid 25 for the operation of the switch 2. The other pole of the solenoid is connected by means of a wire 26 through a plate 26ª on switch 2 with the negative battery connection 16. The lever of switch 2 is provided with a plate 27 arranged to make contact between points 28 and 29 of said switch, the point 28 is connected with wire 26 by wire 30. Contact 29 is connected by means of wire 31 with the solenoid 32 of the self closing switch 3. The opposite pole of the solenoid 32 is connected by wire 33 with the wire 20. The contact plate 34 of the switch 3 is arranged to contact with points 35 and 36 of said switch, the point 35 is connected with wire 20 by means of a wire 37, and point 36 is connected by means of wire 38 with the positive battery connection 15. The connection 23 on the panel is connected by wire 39 through a plate 39ª on switch 12 with the solenoid 40 of the trip switch 12, the opposite pole of said solenoid being connected by means of wire 41 with the negative wire 21. A wire 42 connects the wire 39 through a plate 42ª on switch 9 with one pole of a solenoid 43 for operating the trip switch 9. The other pole of said solenoid is connected with the wire 41 as shown.

For connecting the batteries A. and B.

plugs 44 and 45 are provided, the plug 44 being connected by means of wires 46 and 47 to the positive battery connection 14 and negative battery connection 16 respectively; and the plug 45 being connected by means of wires 48 and 49 to the positive connection 15 and negative connection 16 respectively.

The plugs 44 and 45 are provided with contact points 50 and 51 respectively, arranged to engage in the sockets of plugs 52 of the trucks. The positive contacts of plugs 52 are connected by means of wires 53 to one pole of ampere hour meters 4 mounted preferably upon the trucks, the other pole of the meters 4 are connected by wires 54 with the truck batteries A. and B. respectively. The negative poles of the plugs 52 are connected by wires 55 with said batteries. The needles 5 of the meters 4 are electrically connected with the wires 54. A pin 6 in the face of the meter for battery A is connected by means of a wire 56 with the connection 22 on the panel, a snap connection 57 being provided for temporarily closing the connection. The pin 6 of switch 4 for controlling battery B is similarly connected by means of wire 55 and snap connection 54 with the connection 23 of the panel. Each of the switches 2, 9 and 12 is provided with a trip mechanism typically illustrated in the drawings by triggers 60 and springs 61, which operate in the ordinary manner upon the energizing of the trip coils 25, 40 and 43.

The operation of the device will be apparent from the foregoing description thereof to those skilled in the art. In order to charge the batteries A and B, the plugs 44 and 45 are connected in the socketed plugs of the respective trucks in the ordinary manner. The needles 5 during the previous use of the batteries have, it will be understood, moved clockwise to indicate the discharge, and they thus point to the amounts necessary to recharge the batteries. The snap connections 57 are also joined. The switches 9, 12 and 2 are then closed. A direct current then flows from the generator through the wire 11, switch 12, wire 20, switch 2, wires 17, 46 and 53, through the meter 4 and battery A; thence through the negative wires 55, 47 and 21 to the generator. As the battery is charged the needle 5 moves counter-clockwise until, when fully charged the needle contacts with the pin 6, thus establishing a shunt circuit through the wires 56 and 24 to the solenoid 25, wire 26, plate 26ª and wire 21 to the generator; the solenoid 25 opens the switch 2 and causes the plate 27 to contact with points 28 and 29, thus establishing a circuit over wires 20 and 33 through the solenoid 32, wire 31, plate 27, wires 30, 26 and 21 to the generator. The solenoid 32 causes the plate 34 of the switch 3 to contact with the points 35 and 36 of said switch, thus completing a circuit through the wires 20, 37, plate 34, wires 38, 48 and 53, meter 4 of the battery B, wire 54, battery B, wires 55, 49, 47 and 21 to the generator, thus charging the second battery, the flow of current through battery A having, of course, been discontinued by the opening of the switch 2. When battery B is fully charged the needle 5 contacts with the pin 6, thereby establishing a circuit through wires 58 and 39 and plate 39ª to solenoid 40 of switch 12; thence through wires 41 and 21 to the generator, the solenoid 40 opening the switch 12 and discontinuing the flow of current to the second battery. Simultaneously a circuit is established over the wire 42, plate 42ª, through solenoid 43 and wire 41 which automatically disconnects the trip oil switch 9, controlling the alternating current supply line. The opening of either of the switches 2, 9 and 12 simultaneously opens the shunt circuit through its trip coil.

By the use of the several instruments and connections above described it will be seen that a plurality of storage batteries of the nature mentioned may be consecutively charged, the necessary disconnections and connections for charging each subsequent battery being automatically attended to. It will thus be seen, furthermore, that the necessity for duplication of motor generator sets and other expensive equipment, as for instance additional charging units or panels, is entirely obviated, and there results, therefore, not only a saving in the time and attention, which is required for the charging of a plurality of batteries, but also a great economy in the original installation of the necessary equipment.

Having thus described my invention what I claim as new and desire to secure by Letters Patent is:—

1. Means for charging storage batteries comprising in combination with a charging circuit, a switch for controlling said circuit, and electrical connections for a plurality of storage batteries to be consecutively charged by said circuit, of means for manually closing the circuit through the first battery to be charged, a meter for gaging the charge to each battery, means whereby each of said meters is arranged automatically to open the charging circuit through its battery and to close the charging circuit through the succeeding battery, and means whereby the meter for the last battery is arranged automatically to open the switch in said charging circuit.

2. Means for charging storage batteries comprising in combination with a charging circuit, a trip switch for controlling said circuit and electrical connections for a plurality of storage batteries to be consecutively charged by said circuit, of an automatic circuit breaking switch for closing the circuit through the first battery to be charged, a self closing switch for closing the circuit through a subsequent battery to be charged, means on said automatic circuit breaking switch for closing a shunt circuit to operate said self-closing switch, a meter for gaging the charge to each battery, the meter for said first battery being provided with electrical connections for the operation of said automatic circuit breaking switch to disconnect said first battery, and to operate said self-closing switch, and the meter for the last battery being provided with electrical connections for the opening of the trip switch in said charging circuit.

3. Means for charging storage batteries comprising in combination with an alternating current motor, a trip switch for controlling the current to said motor, a generator arranged to be driven by said motor, a charging circuit supplied by said generator, a trip switch for controlling said charging circuit, and electrical connections for a plurality of storage batteries to be consecutively charged by said circuit, of means for manually closing the circuit through the first battery to be charged, a meter for gaging the charge to each battery, means whereby each of said meters is arranged automatically to open the charging circuit through its battery and to close the charging circuit through the succeeding battery, and means whereby the meter for the last battery is arranged automatically to open the trip switches in said motor and charging circuits.

4. Means for charging storage batteries comprising in combination with an alternating current motor, a trip switch for controlling the current to said motor, a generator arranged to be driven by said motor, a charging circuit supplied by said generator, a trip switch for controlling said charging circuit, and electrical connections for a plurality of storage batteries to be consecutively charged by said circuit, of an automatic circuit breaking switch, for closing the circuit through the first battery to be charged, a self-closing switch for closing the circuit through a subsequent battery to be charged, means on said automatic circuit breaking switch for closing a shunt circuit to operate said self-closing switch, a meter for gaging the charge to each battery, the meter for said first battery being provided with electrical connections for the operation of said automatic circuit breaking switch to disconnect said first battery and to operate said self-closing switch, and the meter for the last battery being provided with electrical connections for opening of the trip switches in said motor and charging circuits.

CLARENCE E. OGDEN